United States Patent [19]
Itoh

[11] Patent Number: 5,451,853
[45] Date of Patent: Sep. 19, 1995

[54] STARTING DEVICE FOR A SINGLE PHASE INDUCTION MOTOR

[75] Inventor: Kazuo Itoh, Nagoya, Japan

[73] Assignee: Yamada Electric Mfg. Co., Ltd., Nagoya, Japan

[21] Appl. No.: 160,864

[22] Filed: Dec. 3, 1993

[30] Foreign Application Priority Data

Dec. 5, 1992 [JP] Japan .................. 4-350856
Apr. 2, 1993 [JP] Japan .................. 5-100201
Jul. 20, 1993 [JP] Japan .................. 5-200955

[51] Int. Cl.⁶ ............................. H02P 1/44
[52] U.S. Cl. .................. 318/788; 318/783; 318/792; 361/26; 361/32; 361/105
[58] Field of Search ............ 318/778, 781–796; 361/23–34, 103–106

[56] References Cited

U.S. PATENT DOCUMENTS

| | | |
|---|---|---|
| 3,414,789 | 12/1968 | Prouty . |
| 3,544,869 | 12/1968 | Plooffe et al. ............ 318/788 |
| 3,549,970 | 12/1970 | Lewus . |
| 3,562,614 | 7/1986 | Gramkow ............ 318/788 |
| 3,643,142 | 2/1972 | McBride ............ 318/788 |
| 3,683,250 | 8/1972 | Fricker ............ 318/788 |
| 3,832,612 | 8/1974 | Woods ............ 318/788 |
| 4,047,082 | 7/1977 | Scheuer et al. ............ 318/788 X |
| 4,468,604 | 8/1984 | Zaderej ............ 318/786 |
| 4,574,229 | 3/1986 | Kim ............ 318/788 |
| 4,605,888 | 8/1986 | Kim ............ 318/786 |
| 4,761,601 | 8/1988 | Zaderej ............ 318/786 |
| 5,051,681 | 9/1991 | Schwarz ............ 318/786 |
| 5,053,908 | 10/1991 | Cooper et al. ............ 318/783 X |

FOREIGN PATENT DOCUMENTS 58-168832 11/1983 Japan .

Primary Examiner—David S. Martin
Attorney, Agent, or Firm—Cushman, Darby & Cushman

[57] ABSTRACT

A starting device for a single phase induction motor can reduce the power consumption and restart in a short time. The starting device for the single phase induction motor having a main winding and a starting winding comprises a starting positive temperature coefficient thermistor connected in series with the starting winding, a bidirectional current control device connected in series with the starting winding and the starting positive temperature coefficient thermistor, and an auxiliary positive characteristic thermistor having a heat capacity smaller than that of the starting positive temperature coefficient thermistor connected in parallel with the starting positive temperature coefficient thermistor, a terminal of the auxiliary positive temperature coefficient thermistor being connected to a gate of the bidirectional current control device.

7 Claims, 8 Drawing Sheets

STARTING DEVICE FOR A SINGLE PHASE INDUCTION MOTOR

FIELD OF THE INVENTION

This invention relates to starting devices for single phase induction motors of refrigerator compressors, pumps or the like.

BACKGROUND OF THE INVENTION

A prior starting device for a refrigerator compressor motor is explained with reference to FIG. 13. A single phase induction motor 20.comprising a main winding 22 and a starting winding 23 that is located in phase difference relationship with respect to main winding 22, is connected to a starting device comprising a positive temperature coefficient thermistor (hereafter referred to as PTC) in series with starting winding 23, and is connected to a source E via an overload relay 24. When voltage from source E is applied to single phase induction motor 20, since starting PTC 25 has a low resistance, large current flows through starting winding 23, then a rotator (not shown) is rotated. After single phase motor 20 has started, starting PTC 25 becomes a high resistance by self-heating of the current therein, therefore the current through starting winding 23 is significantly reduced, thus motor 20 becomes static.

However, in the above mentioned configuration, while starting, a large current of up to 10 amperes has to flow through the starting PTC during 0.5 to several seconds, which requires considerable heat capacity. Thus, even when the motor becomes static, the starting PTC consumes power of 2 W to 4 W in order to maintain the high temperature and resistance so as to reduce the current, which prevents energy-saving in the motor.

Furthermore, in the above mentioned configuration, while starting, there is a problem in that it is hard to restart the motor immediately after it has stopped. That is, since the starting PTC has a large heat capacity, once it reaches a high temperature and high resistance during operation, it takes approximately 20 to 30 seconds to several minutes after the motor is stopped to reduce to a near normal temperature, i.e., to return to a condition from which it can be restarted. Therefore, if one tries to start the motor before it reaches a suitable starting condition, only a small amount of current flows through the starting winding since the starting PTC is at high resistance, the rotator of the motor is locked, a large amount of current flows through main winding 22 to operate overload relay 24, and the motor is notable to be restarted. At the beginning, reset time of this overload relay 24 is shorter than the cooling time in which the starting PTC returns to suitable starting condition, overload relay 24 repeats the operation and reset several times and the temperature thereof rises to increase the reset time. When the reset time of overload relay 24 becomes longer than the above mentioned cooling time of the starting PTC, the motor can be restarted. That situation happens, for example, when a door thereof is opened and the temperature in the refrigerator rises to turn on the thermostat, immediately after which the refrigerator compressor motor is stopped by turning off the thermostat on account of a drop in temperature in the refrigerator. In such case, not only does it take time to restart the motor, but also the life of the overload relay is shortened by repeating the operation and reset.

It is accordingly an object of the present invention to provide a starting device of a single phase induction motor for reducing power consumption. It is a further object to provide a starting device which restarts a single phase induction motor in a short time.

SUMMARY OF THE INVENTION

In accordance with the present invention, a starting device for a single phase induction motor having a main winding and a starting winding is disclosed. The device comprises a starting positive temperature coefficient thermistor connected in series with the starting winding, a bidirectional current control device connected in series with the starting winding and the starting positive temperature coefficient thermistor, and an auxiliary positive temperature coefficient thermistor having a heat capacity smaller than that of the starting positive temperature coefficient thermistor connected in parallel with the starting positive temperature coefficient thermistor, a terminal of the auxiliary positive temperature coefficient thermistor being connected to a gate of the bidirectional current control device.

In the starting device for the single phase induction motor, when the source voltage is applied to the single induction motor on starting, a trigger signal is applied via the auxiliary PTC to the gate of the bi-directional current control device connected to the starting winding in series, and the bi-directional current control device is turned on to pass a starting current through the starting winding. When the single phase induction motor starts, the auxiliary PTC reaches a high temperature to reduce the trigger signal (current) applying to the gate of the bi-directional current control device, and the bi-directional current control device is turned off.

When the single phase induction motor is static, the current flows through the auxiliary PTC continuously, but the power consumption thereof required to maintain the high temperature and resistance is very little, since the heat capacity of the auxiliary PTC is smaller than that of the starting PTC. Even if one tries to restart the single phase induction motor immediately after it has stopped, the motor is able to be restarted. Since the auxiliary PTC has a small heat capacity, it is cooled in a short time and allows the current to flow which turns on the bi-directional current control device.

DESCRIPTION OF THE PREFERRED EMBODIMENT

Embodiments of this invention will now be described in detail with reference to the accompanying drawings.

Figure 1:
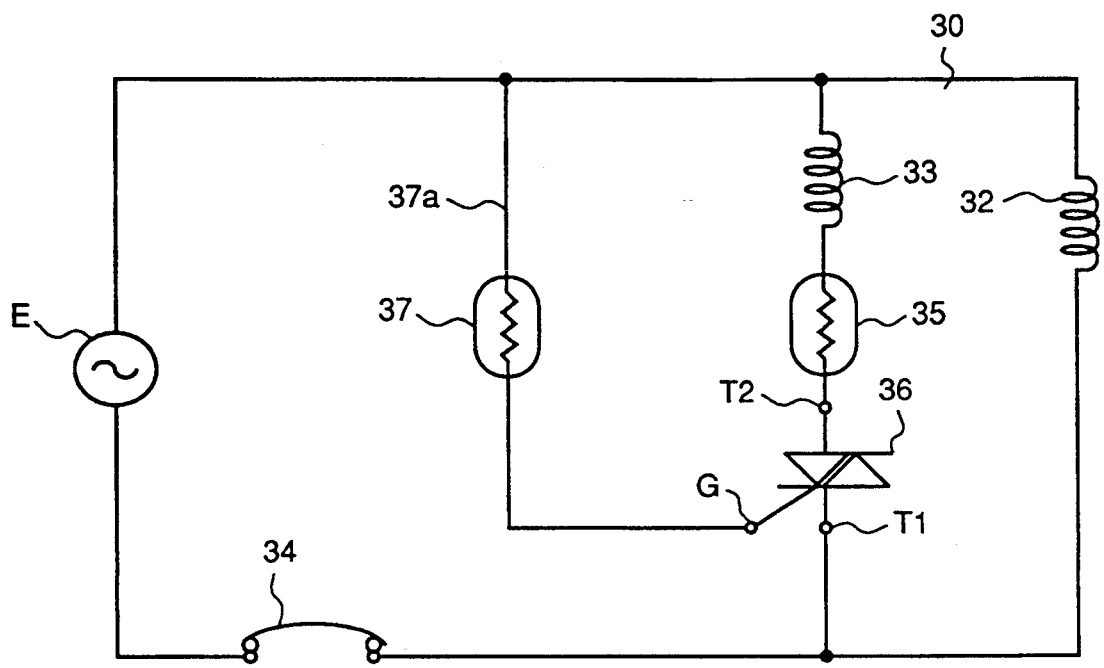
FIG. 1 is a circuit diagram of a starting device for a single phase induction motor according to a first embodiment of the present invention.

FIG. 1 shows a starting device for a single phase induction motor 30 according to a first embodiment of the present invention. The single phase induction motor 30 comprises a main winding 32 and a starting winding 33. The starting device comprises a starting PTC 35, a triac 36 having main electrodes T1, T2 and a gate G, and an auxiliary PTC 37 having a heat capacity smaller than that of starting PTC 35. The starting PTC 35 and triac 36 are connected to starting winding 33 of motor 30 in series. The auxiliary PTC 37 is connected to starting PTC 35 in parallel, one terminal of auxiliary PTC 37 is connected to gate G of triac 36 and the other terminal 37a is connected to a source E.

On starting, when the source E is applied to the starting device, gate current flows through auxiliary PTC 37 to turn on triac 36, and the triac passes a sufficiently large starting current, such as up to ten amperes, through starting winding 33 to start motor 30, since starting PTC has a low resistance such as 3.3 to 47 ohms and auxiliary PTC is 1 to 3 kiloohms at a normal temperature.

After 0.5 to several seconds, the motor 30 approaches a static condition, starting PTC 35 becomes a high resistance and the current through starting winding 33 reduces to approximately 20 or 30 milliamperes. And, auxiliary PTC 37 also becomes a high resistance to reduce the gate current to triac 36, and the triac turns off the current through starting winding 33. The starting of motor 30 is thus completed and starting PTC 35 begins to cool.

Figure 13:
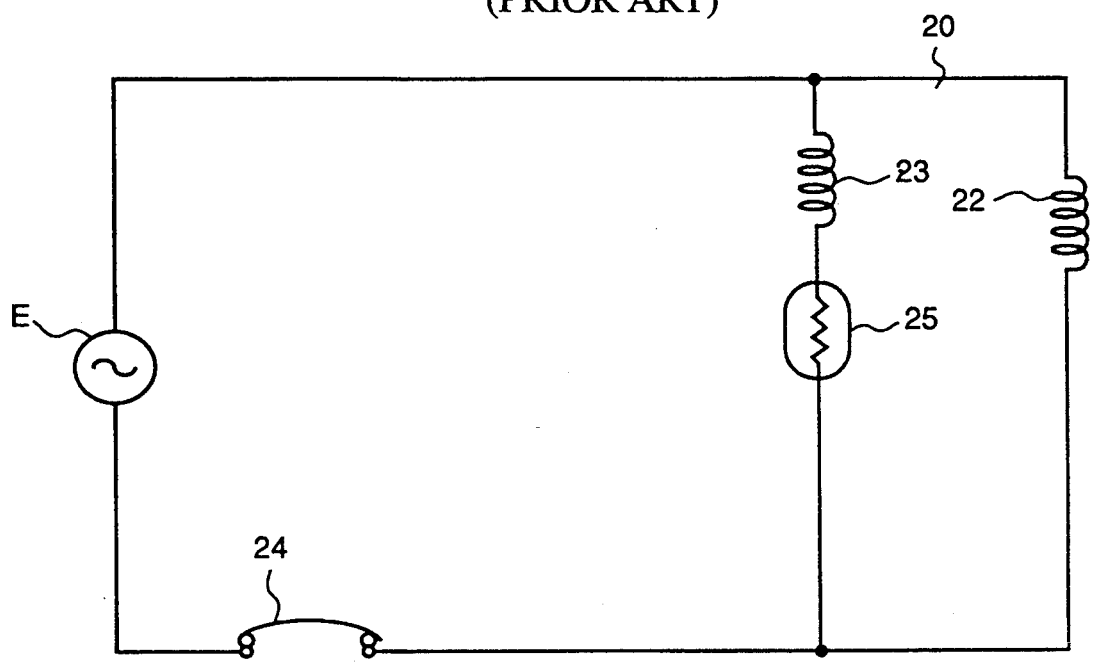
FIG. 13 is a circuit diagram of a conventional starting device.

In this embodiment, the resistance value of the auxiliary PTC 37 is adjusted so that current thereof flows sufficiently to trigger triac 36 (20-30 miliamperes at a normal temperature, 40-60 miliamperes at a low temperature). The value of current through auxiliary PTC 37 for triggering triac 36 is thus below 1 percent of the current through starting winding 33. Accordingly, the volume of auxiliary PTC 37 can be reduced below 1 percent of that of the starting PTC 35, and the current value through auxiliary PTC 37 required to maintain the high resistance and temperature can be reduced to 1-3 milliamperes. Therefore, in the embodiment, compared to the conventional device shown in FIG. 13 of which the current through starting PTC 25 is 20 to 40 miliamperes for suppressing the current through starting winding 23, the current through auxiliary PTC 37 can be reduced to less than 10 percent and the power consumption can be significantly reduced.

Further, starting PTC 35 having a large heat capacity is cooled to a normal temperature during the static operation of the single phase induction motor 30. Otherwise, auxiliary PTC 37 having a small heat capacity can be cooled very rapidly. Accordingly, in the case where one tries to restart the motor 30 immediately after it has stopped, auxiliary PTC 37 is cooled to near normal temperature in a short time, the motor 30 can be restarted within several ten seconds, without overload relay 34 repeating on and off operation, unlike the above mentioned conventional device.

Figure 2:
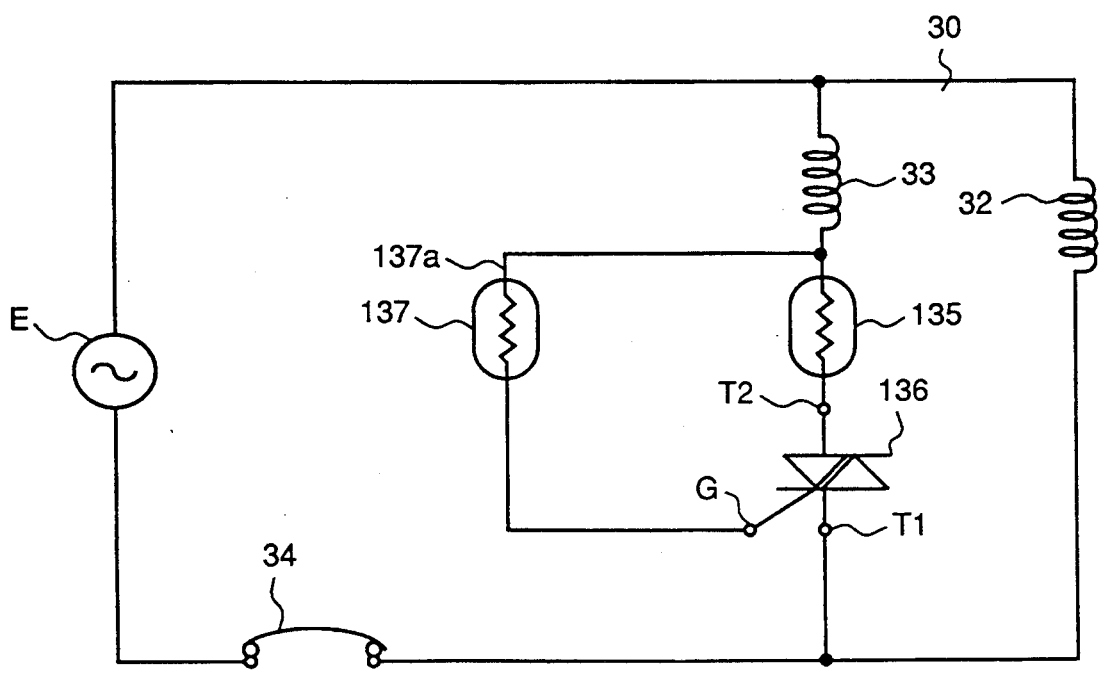
FIG. 2 is a circuit diagram of another starting device for a single phase induction motor according to the first embodiment of the present invention.

FIG. 2 shows another configuration of the first embodiment. Hereinafter, parts similar to the starting device shown in FIG. 1 are denoted by similar numerals and thus detailed explanations thereof are omitted. In the configuration shown in FIG. 1, terminal 37a of auxiliary PTC 37 has been directly connected to source E. In the configuration shown in FIG. 2, a terminal 137a of an auxiliary PTC 137 is connected between starting winding 33 and a starting PTC 135. Thus, the configuration shown in FIG. 2 has the following advantages compared to the configuration shown in FIG. 1.

In the configurations shown in FIG. 1 and FIG. 2, auxiliary PTCs 37, 137 have to be kept at a high resistance and temperature to turn on triacs 36, 136 until the motors 30 reach static operation. In the configuration shown in FIG. 1, since 100 volts (100 volts is used as source voltage in Japan) is always applied to auxiliary PTC 37, the auxiliary PTC requires a certain heat capacity, meaning a certain volume, to generate heat using 5 W with a current (50 miliamperes) required to trigger triac 36 and retain 0.5 to several seconds required to actuate the motor.

In a refrigerator compressor motor, in general, voltage applied to starting PTC 35 varies a great deal between starting and static conditions, i.e., the voltage drops to 40 to 50 volts during the starting and rises to 150 to 160 volts during the static condition in the case of 100 volts being used as the source voltage. Accordingly, if terminal 137a of auxiliary PTC 137 is connected between starting winding 33 and starting PTC 135 as shown in FIG. 2, only voltage of 40 to 50 volts is applied to starting PTC 135 and the same voltage is applied to auxiliary PTC 137 while starting. The applied voltage is reduced to 40 to 50 percent, compared to the configuration shown in FIG. 1 in which 100 volts is applied to auxiliary PTC 37. The amount of heat generated in auxiliary PTC 137, corresponding to 2nd power of the applied voltage, is reduced to 16 to 25 percent. Therefore, to supply a trigger current of 50 miliamperes to triac 36 as in the configuration of FIG. 1, the configuration in FIG. 2 can retain a sufficient time for the starting with auxiliary PTC 137 having a relative small volume.

Figure 3:
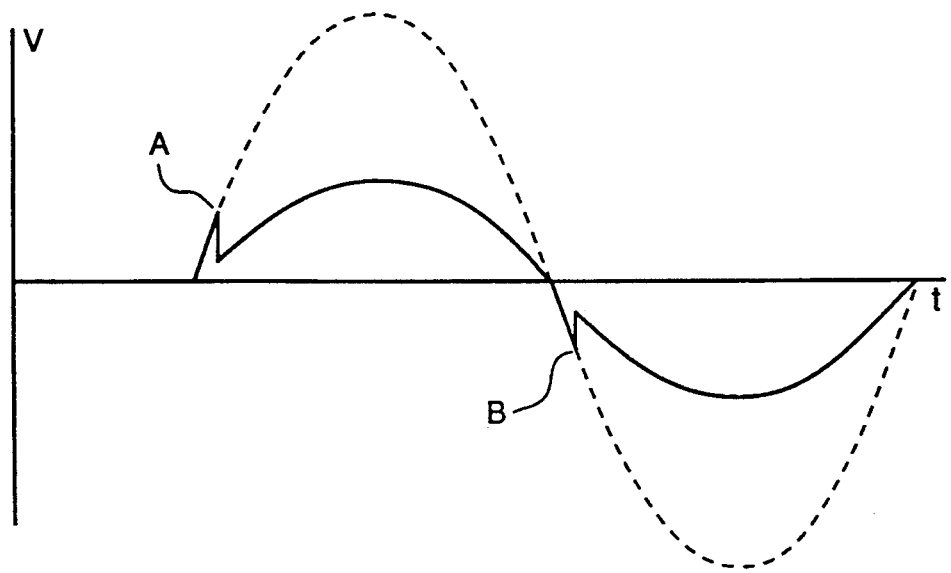
FIG. 3 is a waveform chart of voltage applying to the starting device shown in FIG. 2 in the very beginning stage of starting.

Further, in the configuration shown in FIG. 2, even the voltage applied auxiliary PTC 137 is reduced to 40 to 50 volts, as shown in FIG. 3 illustrating a change of the voltage applied auxiliary PTC 137 in one cycle, the change of the voltage is the same as a dotted line until point A or point B at which triac 136 turns on, which dotted line illustrates the case where the source voltage of 100 volts is applied directly. That is, the source voltage of 100 volts is directly applied to auxiliary PTC 137 until triac 136 is triggered to allow the current to flow through starting winding 33. Thus, the triggering can be achieved without reducing the resistance of auxiliary PTC 137 so as to increase the current thereof. After starting procedure is completed, the voltage applied to auxiliary PTC 137 rises to 150 to 160 volts due to a backward voltage of the main winding 32 in the operational condition, auxiliary PTC 137 reduces a high temperature and a high resistance in a short time, and the current to triac 136 is reduced to non-trigger-current-value to turn off triac 136.

Figure 4:
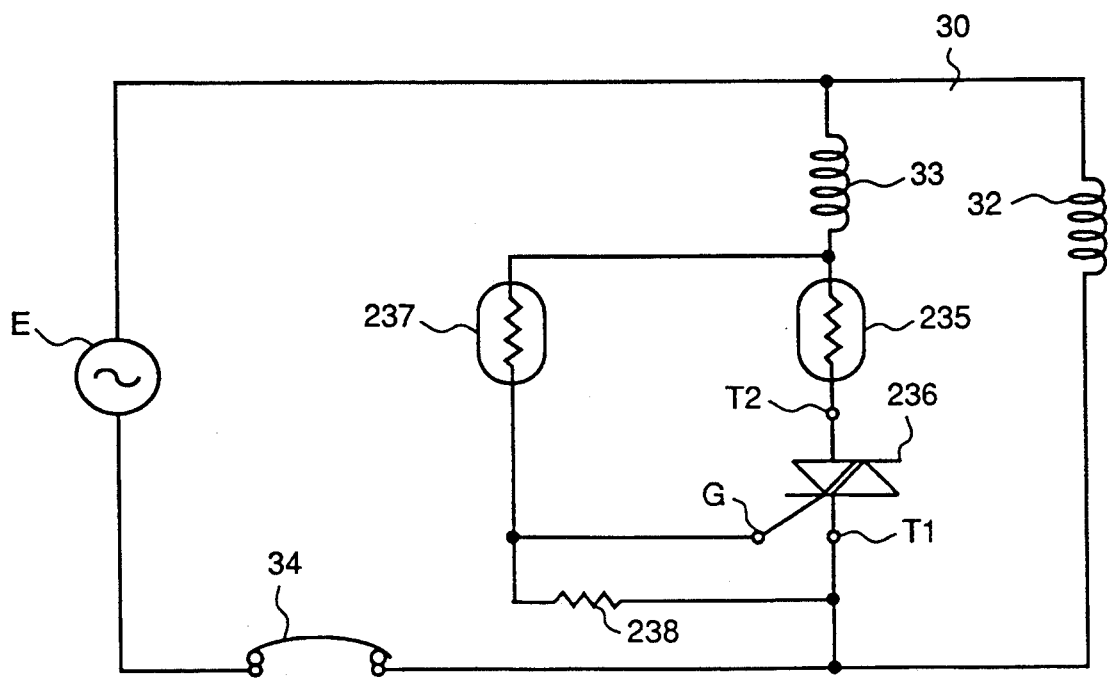
FIG. 4 is a circuit diagram of still another starting device for a single phase induction motor according to the first embodiment of the present invention.

FIG. 4 shows still another configuration of the first embodiment. In the configurations shown in FIG. 1 and FIG. 2, the gate current is often hard to reduce below non-trigger-current-value, since triacs have various of the non-trigger-current-values or only a very small non-trigger-current value according the type of triac. Thus, in the configuration shown in FIG. 4, a bypass resistor 238 is connected between a gate G and a gate side main electrode T1 of a triac 236, because the voltage between gate G and main electrode T1 of triac 236 is substantially constant, regardless of a change in the gate current. Therefore, any current below a certain value is prevented from flowing into gate G so as to turn off triac 236 securely.

Figure 5:
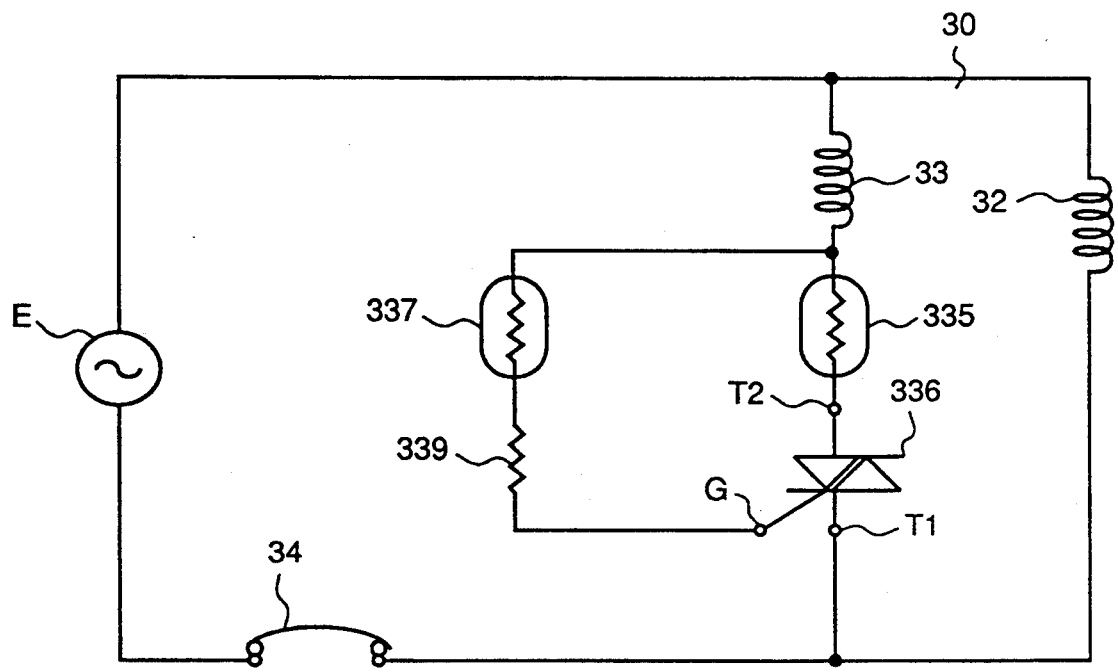
FIG. 5 is a circuit diagram of yet another starting device for a single phase induction motor according to the first embodiment of the present invention.

FIG. 5 shows yet another configuration of the first embodiment. In this configuration, a resistor 339 for adjusting the starting period, is connected between an auxiliary PTC 337 and a gate G of a triac 336. A combination of resistance of auxiliary PTC 337 which varies depending on the temperature and resistance of resistor 339 which is constant, regardless of the temperature, is used to control trigger current. Thus, even if auxiliary PTC 337 having a small heat capacity is used, the starting period can be extended. Further, by combining resistance values of auxiliary PTC 337 and resistor 339, the starting period can be freely adjusted. And, it is possible to achieve a desired operation by using a low cost triac having a low sensitivity, since the gate current is easily increased.

Figure 6:
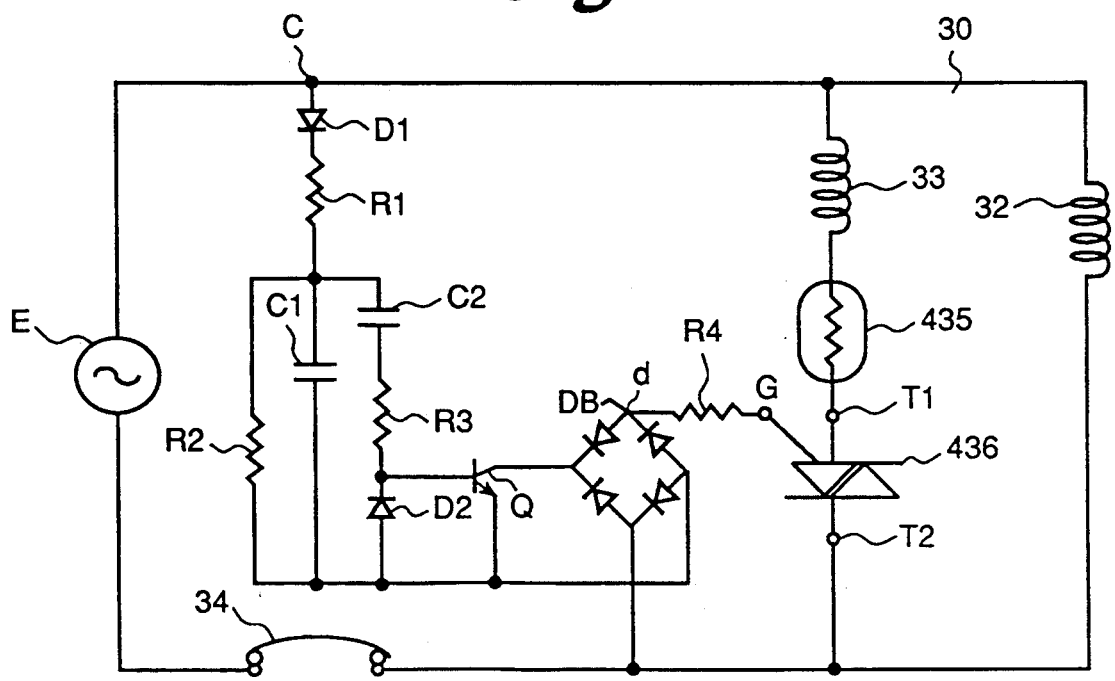
FIG. 6 is a circuit diagram of a starting device for a single phase induction motor according to a second embodiment of the present invention.

FIG. 6 shows a second embodiment of the invention. In the first embodiment shown in FIGS. 1 to 5, the auxiliary PTCs are used as gate circuits which apply gate signals to the triacs to cut off the current through starting windings 33. In the second embodiment, a delay circuit mainly comprising a resistor R3 and capacitor C2 is used as a gate circuit which applies a gate signal to a triac 436. In this gate circuit, a terminal c is connected to a source E and is connected to a diode D1 and a resistor R1 in series. The resistor R1 is connected to a network comprising a resistor R2, a capacitor C1, capacitor C2, resistor R3 and a diode D2. The base of a transistor Q is connected between resistance R3 and diode D2 of the network. A collector of transistor Q is connected to a diode bridge DB. A terminal d of diode bridge DB is connected to a gate of triac 436 via a resistor R4.

When voltage of source E is applied to the starting device to start a single phase induction motor 30, current through diode D1 and resistor R1 begins to charge capacitor C2. Current flows into the base to turn on transistor Q until the charging of capacitor C2 is completed, which depends on a time constant decided by capacitor C2 and resistor R3. Thus, current flows through diode bridge DB and gate current flows into gate G of triac 436 via terminal d of diode bridge DB to turn on triac 436. The triac 436 passes current through starting winding 33. The charging of capacitor C2 is completed after single phase induction motor 30 is started, and the base current to transistor Q is turned off. The gate current to triac 436 is reduced to turn off triac 436, and the current through starting winding 33 is cut off.

When source E is cut off by a switch (not shown), an electric charge stored in capacitor C2 is discharged via resistor R2, diode D2 and resistor R3 within 2 to 3 seconds. Thus, capacitor C2 can be charged again and the motor can be restarted.

In the second embodiment, because the conducting period of triac 436 can be adjusted by the time constant of resistor R3 and capacitor C2, the conducting period can be exactly adjusted comparing to the above mentioned configurations of the first embodiment. Further, in the second embodiment, the electric charge in capacitor C2 is discharged in a short time after the source voltage E applied to the motor 30 is cut off, the configuration can restart the motor 30 in a short time compared to that of the first embodiment which can not be restarted until auxiliary PTC 37 is cooled. In addition, power consumption can be reduced by selecting values of the resistors with respect to the first embodiment.

Figure 7:
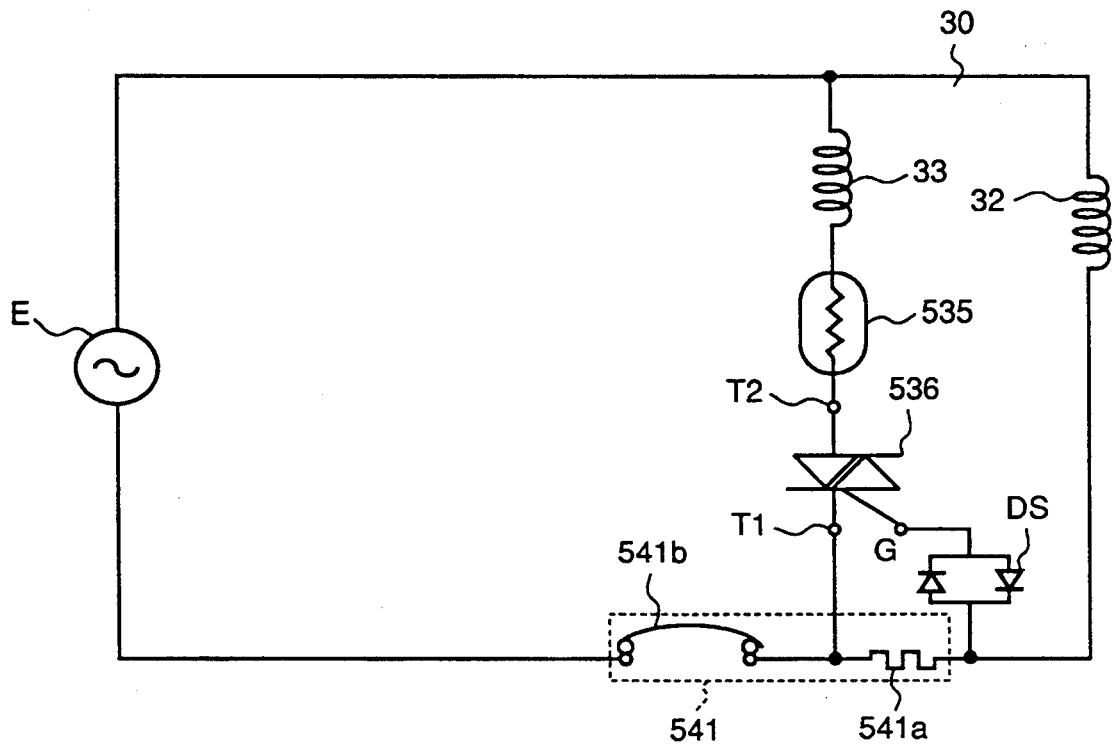
FIG. 7 is a circuit diagram of a starting device for a single phase induction motor according to a third embodiment of the present invention.

FIG. 7 shows a third embodiment of this invention. In the third embodiment, an overload relay 541 is added to a starting device for a single phase induction motor 30. This configuration is constructed so that voltage generated across a heater 541a of overload relay 541 triggers a triac 536. The heater 541a and a bimetal 541b of overload relay 541 are connected to a main winding 32 in series and a main electrode T1 of triac 536 is connected between heater 541a and bimetal 541b. A set of reversed parallel diodes DS is connected to a gate G of triac 536 and to a main winding side terminal of heater 541a.

In the starting device for the motor 30 in the third embodiment, when source voltage E is applied to the motor 30 when starting, because a large amount of current flows through main winding 32, voltage difference across the terminals of heater 541a is generated for triggering triac 536. Gate current flows into gate G via the reversed parallel diodes DS to turn on triac 536. The triac 536 thus passes current through a starting winding 33. When the motor 30 starts, current through main winding 32 is reduced so as to drop the voltage difference between the terminals of heater 541a below a forward direction voltage of the reversed parallel diodes DS. The flow of gate current is prevented and triac 536 is turned off. The third embodiment has an advantage in that auxiliary PTC 37 shown in FIG. 1 is not required.

Figure 8:
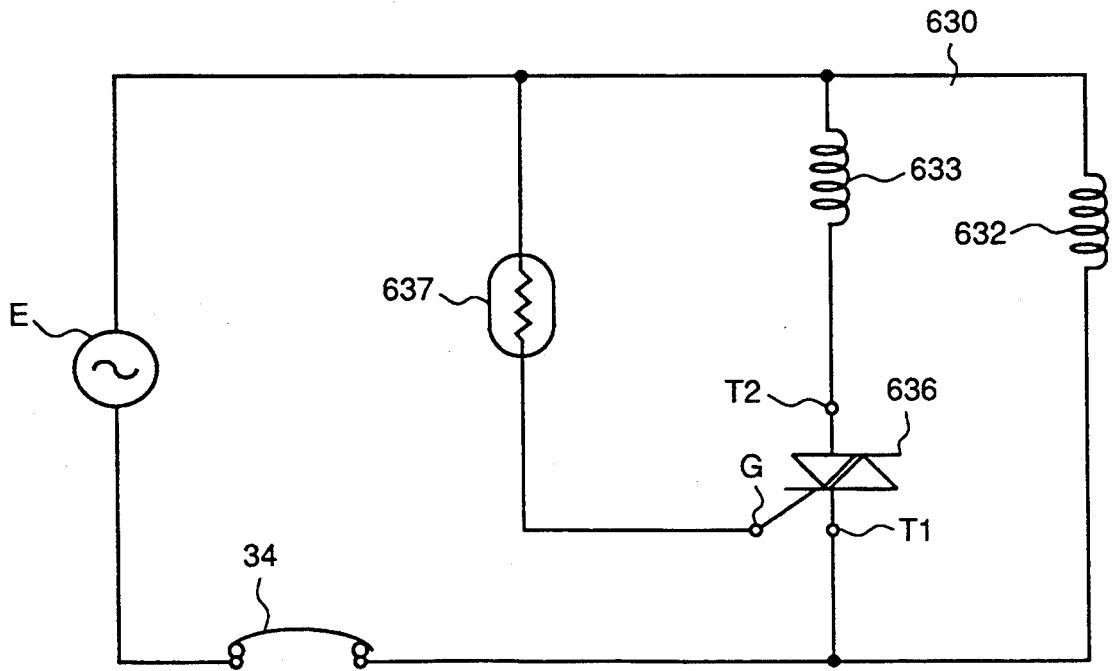
FIG. 8 is a circuit diagram of a starting device for a single phase induction motor according to a fourth embodiment of the present invention.

FIG. 8 shows a fourth embodiment of the invention. In the fourth embodiment, starting PTC 35 shown in FIG. 1 is omitted. In the first embodiment shown in FIG. 1, when the motor 30 is started, starting PTC 35 reaches a high resistance to reduce the current through triac 36. In the fourth embodiment, current of up to ten amperes flows immediately before a triac 636 is cut off. Thus, there is a possibility that the current through triac 636 could generate noise to source E due to the current being controlled with a phase. Therefore, the starting device in the fourth embodiment may be adapted to a small motor which does not make a large noise, or a certain condition such as a pump motor used for agriculture in which the noise does not seriously affect other devices.

Whereas, in the above mentioned configurations in the first to third embodiments using the starting PTCs, when the motors is started, the starting PTCs reach a high resistance, and output currents of the triacs reduce to several tens of miliamperes. Therefore, the starting devices never make noise and can be widely used. Further, in the single phase induction motors or split-phase-start motors using main windings 32 and starting windings 33 in the first to third embodiments, the above mentioned resistance of the starting PTCs increase phase differences between main winding current and starting winding current so as to increase starting torque. Thus, in the case of the configuration shown in FIG. 8, in order to obtain the same starting torque as the first to third embodiments, turns of starting winding 633 have to be increased, and reversed turns have to be rewound the same as the increased turns, so as to increase the resistance thereof without changing inductance. This makes the manufacturing cost of a single phase induction motor 630 expensive.

Figure 9:
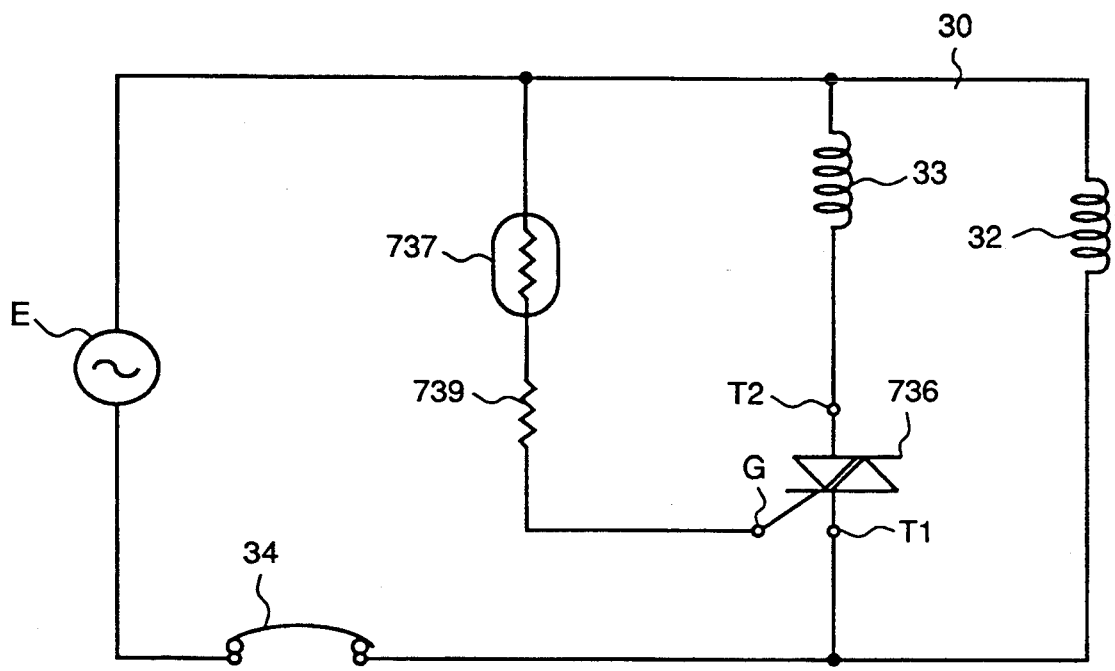
FIG. 9 is a circuit diagram of another starting device for a single phase induction motor according to the fourth embodiment of the present invention.

FIG. 9 shows another configuration of the fourth embodiment. In the configuration, a resistor 739 for adjusting the starting period is added between an auxiliary PTC 737 and a gate G of a triac 736. According to the starting device, an auxiliary PTC having a small heat capacity can realize a longer starting period. In addition, by combining auxiliary PTC 737 and resistor 739 for adjusting the starting period, the starting period can be freely adjusted. Further, because the gate current can be easily increased, a desired operation can be achieved by using a low cost triac having a low sensitivity.

Figure 10:
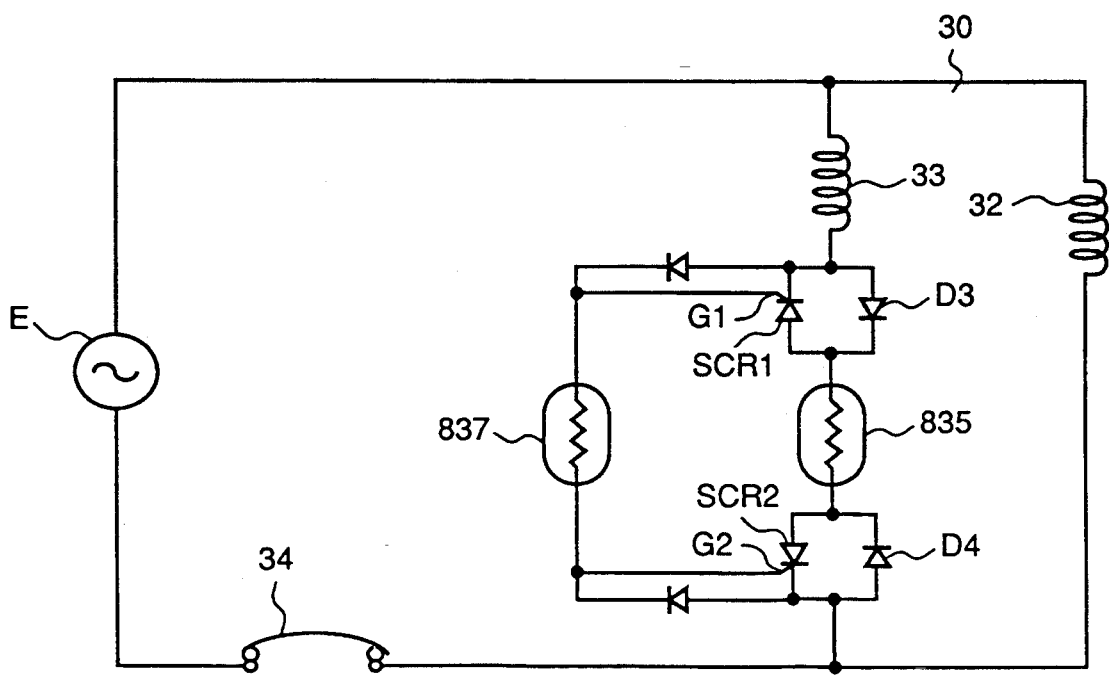
FIG. 10 is a circuit diagram of a starting device for a single phase induction motor according to a fifth embodiment of the present invention.

FIG. 10 shows a fifth embodiment of the invention. In the above mentioned first to fourth embodiments, the triacs are utilized for cutting off the starting winding currents. However, in the fifth embodiment, thyristers SCR1 and SCR2 are utilized for this purpose. A starting PTC 835 is connected between thyristers SCR1, SCR2 in series. A diode D3 and a diode D4 are connected to each thyrister SCR1, SCR2 in reverse parallel. An auxiliary PTC 837 is connected to gates G1, G2 of thyristers SCR1, SCR2.

In the fifth embodiment, while starting motor 30, gate currents flow into gates G1, G2 to turn on thyristers SCR1, SCR2. The thyristers SCR1, SCR2 thus pass current through a starting winding 33. When the motor 30 is started, auxiliary PTC 837 reaches a high temperature and a high resistance to reduce the gate currents to gates G1, G2 of thyristers SCR1, SCR2. The thyristers SCR1, SCR2 thus turn off to cut off the current through starting winding 33.

The starting device of the fifth embodiment is preferably utilized for a single phase induction motor to which is applied more than 200 volts. That is, if the starting devices of the first to fifth embodiments utilized motors for 200 volts, the triacs in the devices have more than 300 to 400 volts applied, which may exceed the voltage-withstand thereof, since the voltage-withstand of a triac generally is not so high. However, a thyrister having a high voltage-withstand is easily available. Therefore, according to the fifth embodiment, a 200 volt starting device to which is applied more than 300 volts, can be easily constructed.

Figure 11:
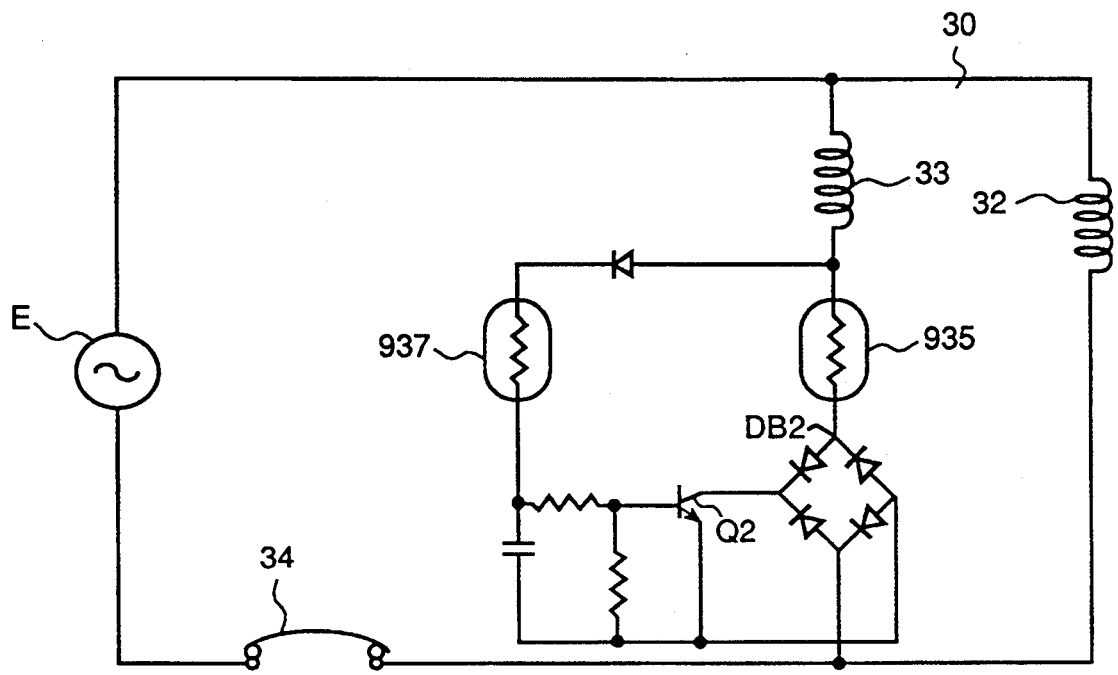
FIG. 11 is a circuit diagram of another starting device for a single phase induction motor according to the fifth embodiment of the present invention.
Figure 12:
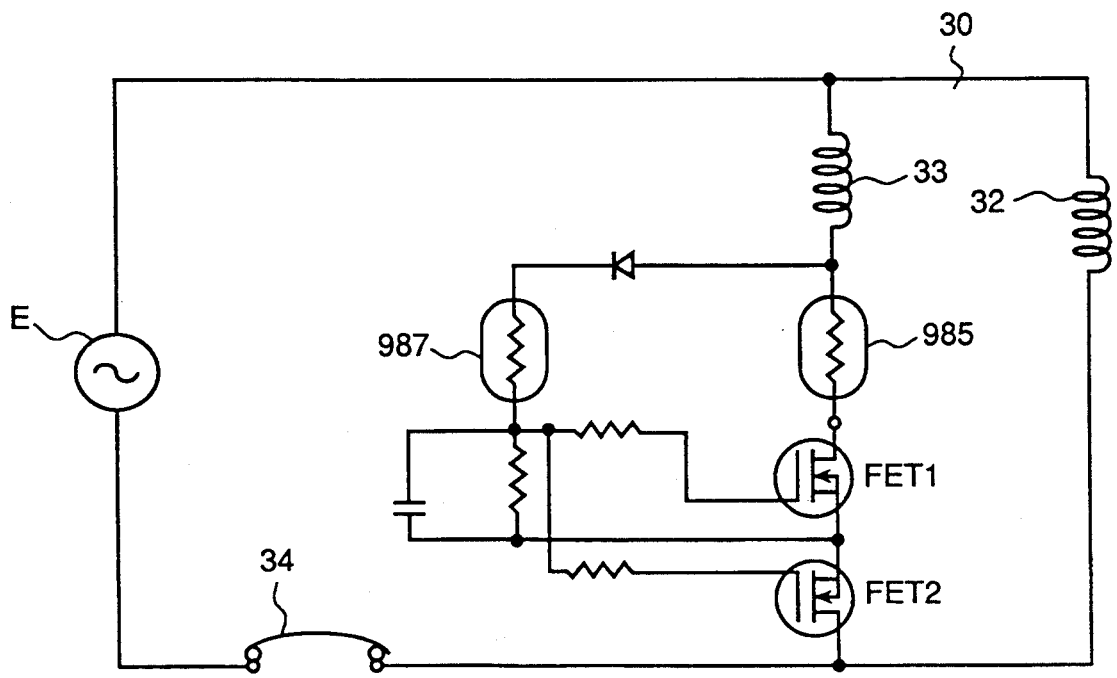
FIG. 12 is a circuit diagram of still another starting device for a single phase induction motor according to the fifth embodiment of the present invention.

Further, FIG. 11 shows an example using a diode bridge DB2 for cutting current through a starting winding 33, and FIG. 12 shows another example using FETs for cutting current through a starting winding 33. As shown in FIGS. 11 and 12, any switching elements are available for cutting the current through the starting winding 33.

Next, a starting device for a single phase induction motor which accommodates the circuit configuration of the first embodiment will be described with reference to FIGS. 14 to 16.

Figure 14:
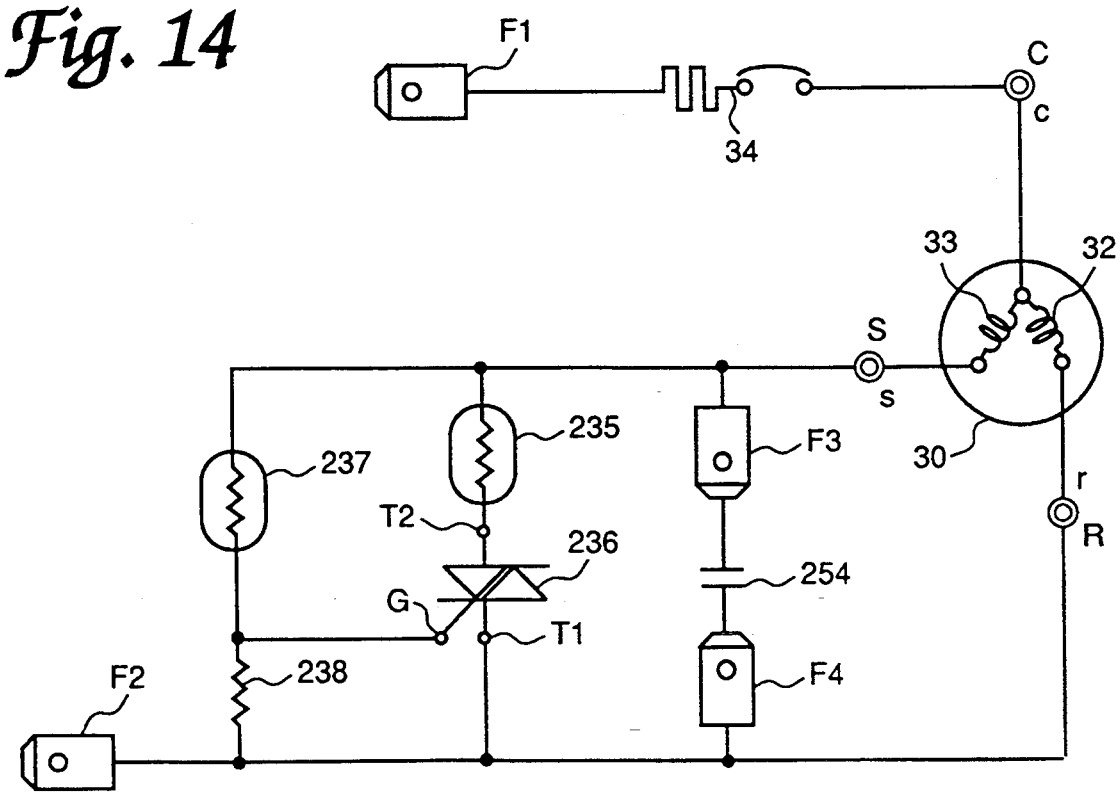
FIG. 14 is a schematic diagram of a starting device for a single phase induction motor according to the first embodiment of the present invention.

A circuit configuration shown in FIG. 14 is substantially the same as the above mentioned configuration shown in FIG. 4. A single phase induction motor 30 comprises a main winding 32 and a starting winding 33. The starting device comprises a starting PTC 235, a triac 236 having main electrodes T1, T2 and a gate G, and an auxiliary PTC 237 having a heat capacity smaller than that of starting PTC 235. The starting PTC 235 and triac 236 are connected to starting winding 33 of the motor 30 in series. The auxiliary PTC 237 is connected to starting PTC 235 in parallel of which one terminal is connected to gate G of triac 236 and the other terminal is connected to a terminal S for connecting starting winding 33. A bypass resistor 238 is connected between gate G and gate side main electrode T1 of triac 236. The bypass resistor 238, main electrode T1 of triac 236 and a terminal R for connecting main winding 32 are connected to a terminal F2 for connecting a source. A terminal C for connecting main winding 32 and starting winding 33 is connected to a terminal F1 for connecting the source via overload relay 34. Further, in the configuration shown in FIG. 14, terminals F3 and F4 are added to connect a running capacitor 254 for single phase induction motor 30.

The starting device connected to running capacitor 254 has to be equipped with starting PTC 235 to protect triac 236. That is, if starting PTC 235 is omitted from the configuration shown in FIG. 14 such as in the configuration shown in FIG. 8, triac 236 may be damaged. Hereafter the reason will be described in detail. Gate current value which turns on triac 236 is substantially constant, the timing at which the gate current flowing auxiliary PTC 237 which turns on triac 236 gradually becomes later as the motor 30 is started. When the gate current value does not exceed a value which turns on triac 236, even if the gate current reaches the peak value of the source, i.e., 90 degrees of sinusoidal wave of the source voltage, the gate current never turns on triac 236. That is, immediately after the motor 30 is started, since auxiliary PTC 237 stays at a low temperature and a low resistance, a large amount of the gate current flows through auxiliary PTC 237 to turn on triac 236 at the beginning of (for example 10 degrees) the sinusoidal wave of the source voltage. The temperature of auxiliary PTC rises and the resistance thereof increases as time passes. Accordingly the gate current does not flow easily, and the timing at which the gate current turns on triac 236 becomes later. Namely, during several cycles immediately before triac 236 is completely cut off, triac 236 has been triggered adjacent to the peak of the sinusoidal wave of the source voltage. Thus, in the starting device comprising running capacitor 254, the electric charge in running capacitor 254 which is charged to the peak value of the sinusoidal wave of the source voltage is discharged instantly when triac 236 is turned on. Therefore, in the case where starting PTC 235 is omitted from the configuration shown in FIG. 14, the current flowing through triac 236 reaches more than 100 to 1000 ampere per microsecond, which is well above the maximum rated value (in general about 50 ampere per microsecond) of the critical rate of rise of on-state current (dIt/dt) of a triac, which damages triac 236 instantly. Whereas, in this embodiment, the current so as to triac 236 is limited by starting PTC 235 so as to prevent damage thereto, since resistance of starting PTC 235 reaches the maximum value when triac 236 is completely turned off. In the embodiment, starting PTC 235 is utilized to protect triac 236. It is possible to utilize a resistor instead of the starting PTC for prevention of damage to the triac.

An explanation of the arrangement of starting device 50 which accommodates the circuit configuration shown in FIG. 14 will now be described with reference to FIGS. 15 and 16.

Figure 15:
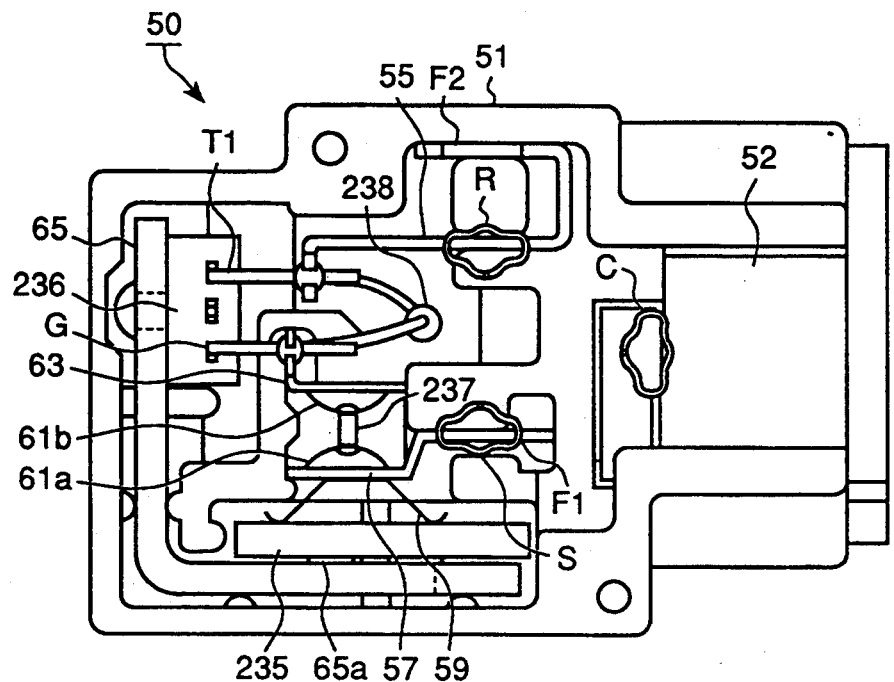
FIG. 15 is a front view of the starting device for the single phase induction motor which includes the circuit shown in FIG. 14.
Figure 16:
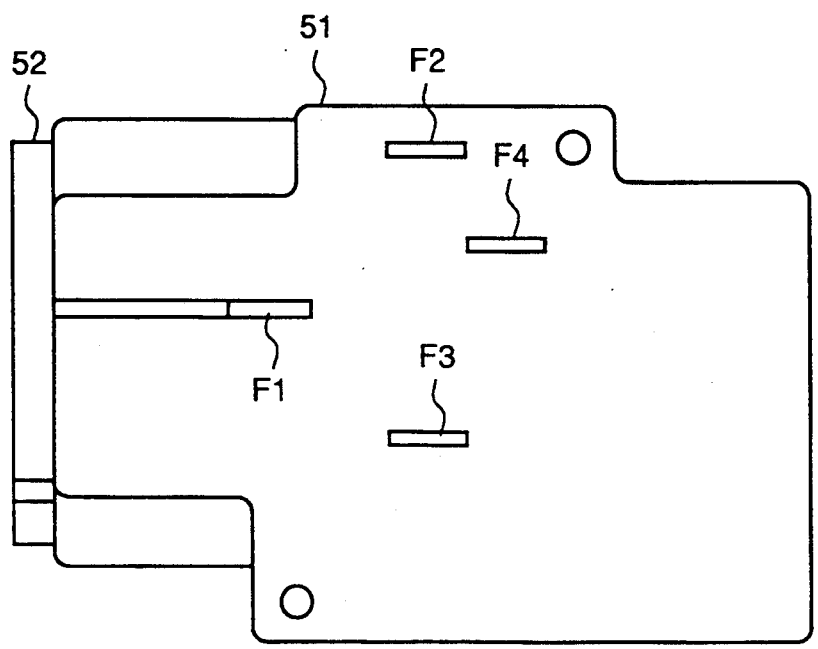
FIG. 16 is a rear view of the starting device for the single phase induction motor which includes the circuit shown in FIG. 14.

FIG. 15 shows a front view of starting device 50 from which the front lid (not shown) is removed. FIG. 16 shows a rear view of device 50. The starting device 50 comprises a case (hereafter referred to as starting device case 51) accommodating starting PTC 235, triac 236, auxiliary PTC 237 and resistor 238, and a case 52 accommodating overload relay 34. The case 52 is inserted into starting device case 51 and fixed therein. In the starting device 50, each terminal C for connecting to main winding 32 and starting winding 33 of the motor 30, terminal R for connecting to main winding 32 and terminal S for connecting to starting winding 33 is extended towards the front. As shown in FIG. 16 illustrating the rear view of starting device case 51, each terminal F4 connected to terminal R and terminal F3 connected to terminal S to be connected to running capacitor 254, and terminal F2 connected to terminal R and terminal F1 connected to overload relay 34 to be connected to the source is extended towards the rear.

As shown in FIG. 15, terminal R is connected to terminals F2, F4, main electrode T1 of triac 236 and resistor 238 though a U shaped metal plate 55. The terminal S is connected to a crank shaped metal plate 57, and connected to starting PTC 235 via a main spring 59 placed below the metal plate 57 and connected to auxiliary PTC 237 via an auxiliary spring 61a placed on the metal plate 57. The auxiliary PTC 237 is connected to resistor 238 via an opposite auxiliary spring 61b and an L shaped metal plate 63. The metal plate 63 is also connected to gate G of triac 236. The triac 236 is installed in a vertical portion of an L shaped radiating metal plate 65 and main electrode T2 thereof is electrically connected thereto. A projection 65a formed on a horizontal portion of L shaped radiating metal plate 65 connects main electrode T2 of triac 236 to starting PTC 235. Holes in the lid (not shown) are formed to expose thererthrough the terminals R, C, S of the starting device 50 so that a connector (not shown) supporting terminals r, c, s of the motor 30 is connected to the terminals R, C, S.

The starting device 50 is structured to be connected to the motor 30 by inserting the connector for supporting terminals r, c, s of the motor 30 to the front terminals R, C, S; connecting the rear terminals F1, F2 to the source and connecting the rear terminals F3, F4 to running capacitor 254. According to starting device 50 of the embodiment, the starting device can be reduced in size, since starting device case 51 not only accommodates the starting circuit configuration shown in FIG. 14, but also case 52 accommodates overload relay 34.

Although the invention has been disclosed in the context of certain preferred embodiments, it will be understood that the present invention extends beyond the specifically disclosed embodiments to other alternative embodiments of the invention. Thus it is intended that the scope of the invention should not be limited by the disclosed embodiments, but should be determined by reference to the claims that follow.

What is claimed is:

1. A starting device for a single phase induction motor having a main winding and a starting winding, said starting device comprising:
   a positive starting temperature coefficient thermistor connected in series with said starting winding;
   a bidirectional current control device having a gate and being connected in series with said starting winding and said positive starting temperature coefficient thermistor, and;
   a positive auxiliary temperature coefficient thermistor having a heat capacity smaller than that of said positive starting temperature coefficient thermistor and which is connected in parallel with said positive starting temperature coefficient thermistor, a first terminal of said auxiliary positive temperature coefficient thermistor being connected to said gate of said bidirectional current control device, and a second terminal of said positive auxiliary temperature coefficient thermistor is connected between said starting winding and said positive starting temperature coefficient thermistor.

2. A starting device for a single phase induction motor having a main winding and a starting winding, said starting device comprising:
   a positive starting temperature coefficient thermistor is connected in series with said starting winding;
   a bidirectional current control device having a gate and being connected in series with said starting winding and said positive starting temperature coefficient thermistor;
   a positive auxiliary temperature coefficient thermistor having a heat capacity smaller than that of said positive starting temperature coefficient thermistor and being connected in parallel with said positive starting temperature coefficient thermistor, a first terminal of said positive auxiliary temperature coefficient thermistor being connected between said starting winding and said positive starting temperature coefficient thermistor; and
   a resistor which is connected between a second terminal of said positive auxiliary temperature coefficient thermistor and said gate of said bidirectional current control device,
   wherein a starting period is adjusted based on a combined resistance value of said positive auxiliary temperature coefficient thermistor and said resistor.

3. A starting device for a single phase induction motor having a main winding and a starting winding said starting device comprising:
   a positive starting temperature coefficient thermistor is connected in series with said starting winding;
   a bidirectional current control device having a gate and being connected in series with said starting winding and said positive starting temperature coefficient thermistor; and
   a time constant circuit having a capacitor and a first resistor, each having first and second terminals, for applying a gate signal to said gate of said bidirectional current control device until charging of said capacitor is completed, said gate signal only being applied when said single phase induction motor has a source voltage applied to it, said time constant circuit further including a first diode having an anode and a cathode, a second diode having an anode and a cathode, a second resistor having first and second terminals, a transistor having a base, a collector and an emitter, and a diode bridge including first, second, third and fourth terminals, said anode of said first diode being connected to said source voltage, said cathode of said first diode being connected to said first terminal of said capacitor and said first terminal of said second resistor, said second terminal of said capacitor being connected to said first terminal of said first resistor, said second terminal of said first resistor being connected to said base of said transistor and said cathode of said second diode, said second terminal of said second resistor, said anode of said second diode and said emitter of said transistor being connected to said first terminal of said diode bridge, said second terminal of said diode bridge being connected to said gate of said bidirectional current control device, said third terminal of said diode bridge being connected to said collector of said transistor, and said fourth terminal of said diode bridge being connected to said source voltage.

4. A starting device for a single phase induction motor having a main winding and a starting winding comprising:

an overload relay having a bimetal and a heater heating the bimetal, connected in series between the main winding and a source;

a positive temperature coefficient thermistor connected in series with said starting winding, and;

a bidirectional current control device connected in series with said starting winding and said starting positive temperature coefficient thermistor;

wherein the heater of the overload relay is connected between a gate side main electrode of said bidirectional current control device and said main winding, and a main winding side terminal of the heater is connected to a gate of said bidirectional current control device.

5. A starting device for a single phase induction motor having a main winding, and a starting winding connected in series with a running capacitor, said starting device comprising:

a positive starting temperature coefficient thermistor is connected in series with said starting winding and connected in parallel with said running capacitor;

a bidirectional current control device having a gate and being connected in series with said starting winding and said positive starting temperature coefficient thermistor; and a positive auxiliary temperature coefficient thermistor having a heat capacity smaller than that of said positive starting temperature coefficient thermistor and being connected in parallel with said positive starting temperature coefficient thermistor, a terminal of said positive auxiliary temperature coefficient thermistor being connected to said gate of said bidirectional current control device.

6. A starting device for a single phase induction motor according to claim 5, further comprising a case which accommodates the starting positive temperature coefficient thermistor, the bidirectional current control device and the auxiliary positive temperature coefficient thermistor.

7. A starting device for a single phase induction motor according to claim 6 wherein the case further accommodates an overload protecting relay for protecting an overload of the single phase induction motor.

* * * * *